March 12, 1929.  H. F. TOWNER  1,704,929
POWER LIFT IMPLEMENT
Filed Sept. 29, 1926  2 Sheets-Sheet 2
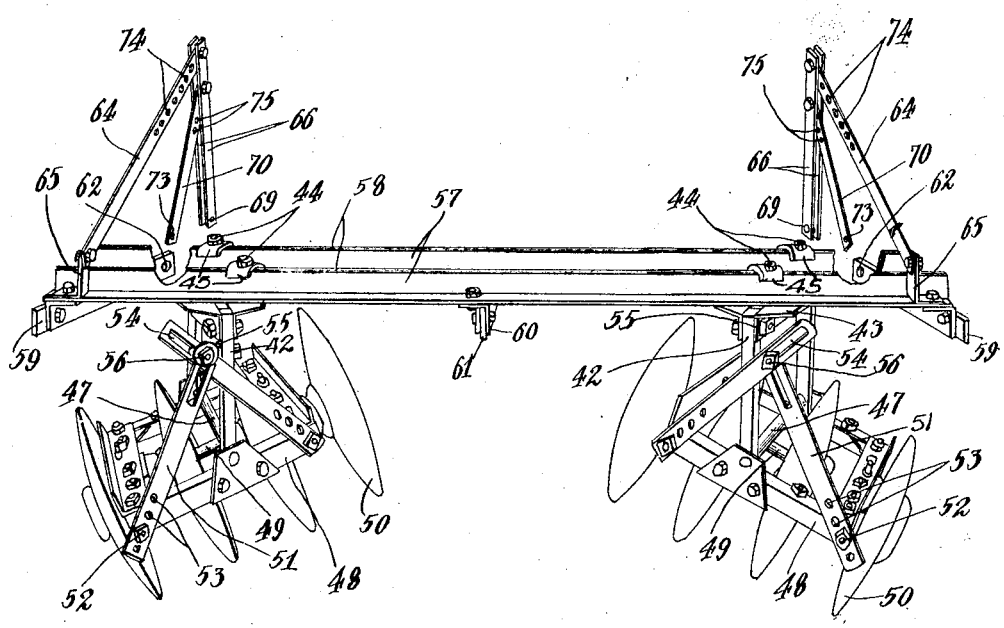
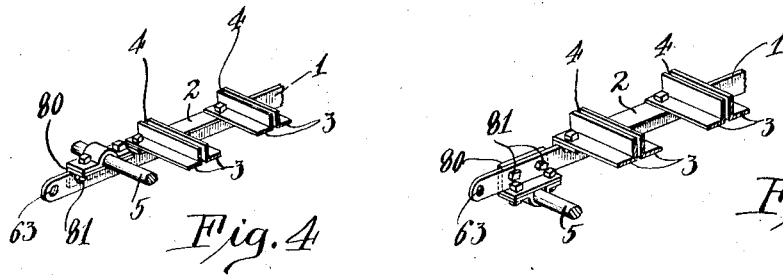
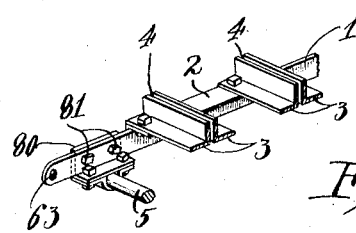
Inventor
Heber F. Towner
By Lyon & Lyon
Attorneys Patented Mar. 12, 1929.

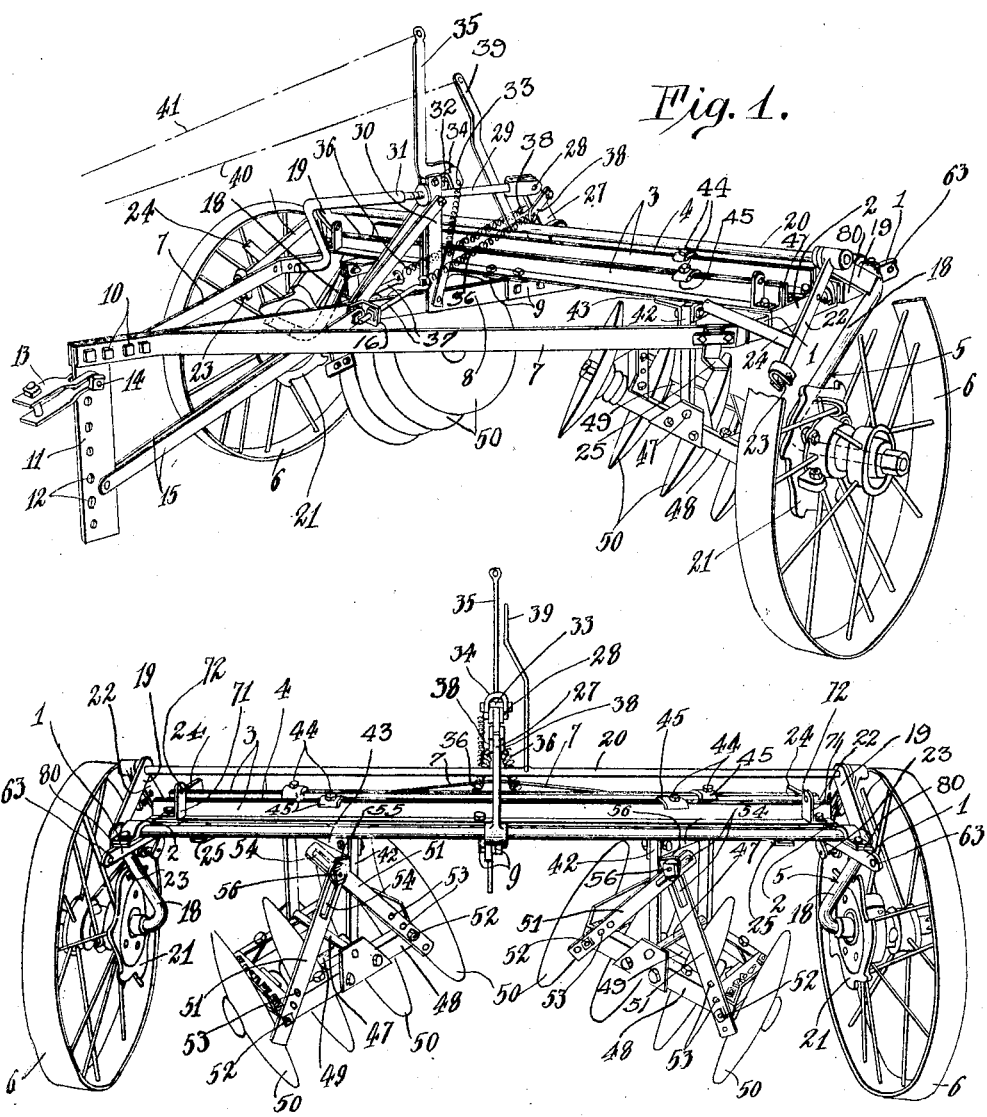

1,704,929

UNITED STATES PATENT OFFICE.

HEBER F. TOWNER, OF SANTA ANA, CALIFORNIA; P. G. BEISSEL EXECUTOR OF SAID HEBER F. TOWNER, DECEASED, ASSIGNOR TO B. V. CURRY, TRUSTEE.

POWER-LIFT IMPLEMENT.

Application filed September 29, 1926. Serial No. 138,531.

This invention relates to power lift implements and is more particularly related to a power lift implement particularly adapted in throwing up asparagus ridges, or like ridges.

In the growing of asparagus, as same matures, it is common practice to throw up ridges along the rows of asparagus during the cultivation thereof. Many devices have been devised for forming these ridges. After the asparagus has matured and the cultivation has ceased, in order to prepare the ground for the planting of asparagus for the next season, it is necessary that these ridges be torn down so as to level the ground for this replanting. During the cultivation of the asparagus, it is necessary that the machine for throwing up the ridges is so constructed that the same will draw the dirt inward and to the roots of the growing asparagus and elevate the same upward to form the necessary ridges without in any way interfering with the growing asparagus or the roots thereof. The condition of the growth of the asparagus and like plants require the throwing up of ridges of different degrees and as the cultivation of the asparagus increases, it is necessary to keep building up these ridges until the end of the cultivation thereof.

In the cultivation of cantaloups for irrigation, it is also found advisable to form ridges in which the cantaloup is planted and between which ridges the irrigation water is allowed to flow. During the maturity of the cantaloup plants, it is also essential that the same be cultivated.

Other and like uses may be made of this invention such, for example, as banking or ridging potatoes.

It is therefore an object of this invention to provide a device which includes a frame, and which frame may be raised or lowered on the ground wheels so as to permit the positioning of the ground working tools, such as discs, in relation to the ground so that the same will operate on forward movement of the device to draw the soil or dirt from between the rows or ridges of the plants and deposit the same near the roots thereof, and in which device means are provided for adjusting the tool carrying means so that any degree of ridging or banking may be accomplished, and which tool carrying device may also be easily adjusted so as to permit the "ridge breaking" to again level the ground after the cultivation of the plants has ended.

Another object of this invention is to provide a device which includes a frame having spaced apart guideway and upon which frame a crank axle is journaled in bearings transversely of the said frame and on which crank axle ground wheels are journaled, and in which device means are provided for rocking the crank axle to elevate the frame and which frame carries sub-frames slidably secured to the frame in the said guideways so as to permit transverse adjustment thereof and which sub-frames are pivotally secured to disc carrying frames so as to permit angular adjustment of the disc carrying frames on the discs carried thereby in relation to the ground.

Another object of this invention is to provide a ridge making implement in which the crank axle, on which the ground wheels are journaled, is journaled in bearings mounted on the frame so that the disc gangs are supported intermediate the tread of the wheels to eliminate from the implement the tendency of "whipping" or "tailing" out of line of draft at the excessive speed (approximately six miles an hour) at which such ridging implements are drawn to throw the soil high and loose.

Other objects and advantages of this invention will be apparent from the following detailed description of a preferred embodiment thereof as illustrated in the accompanying drawings, in which drawings:

Figure 1 is an isometric view of a power lift implement embodying this invention.

Figure 2 is an isometric rear view thereof.

Figure 3 is an isometric rear view of a detachable frame unit adapted to be connected with the frame or power lift unit so as to permit the securing thereto of additional ground working devices for use in step ridging or banking.

Figure 4 is a fragmental perspective view, showing one manner of mounting the crank axle on the frame.

Figure 5 is a like perspective view showing an adjusted position of the crank axle.

In the preferred embodiment of this invention, illustrated in the accompanying drawings, 1 illustrates spaced apart bars, to which bars channel irons 2 are secured and upon which channel irons 2 two pair of spaced apart channel irons 3 are secured so as to provide spaced guideways 4.

Mounted in bearings transversely of the frame structure provided, and to the rear of the second pair of spaced channel irons 3, is a crank axle 5, upon which crank axle 5 ground wheels 6 are journaled.

Secured to the bars 1 at their forward end are a pair of inwardly converging bars 7. Mounted intermediate the bars 1 is a bar 8 to which channel irons 9 are secured, and to which channel irons 9 the spaced apart pairs of channel irons 3 are secured. The bar 8 extends forward from the channel irons 3 and is secured between the bars 7 as the same come together at the forward end of the frame structure by any suitable means such as illustrated at 10.

Secured in advance of the bar 8 at intermediate longitudinally extending portions of the bars 7 is a draft plate 11, which draft plate 11 is provided with a plurality of bores 12. A clevis or like draft hitch device 13 is adapted to be secured by means of a bolt 14 in any one of the bores 12. Brace bars 15 are secured at their forward ends to the plate 11 and at their rearward ends to channel iron sections 16 which are secured to the intermediate bar 8.

Means are provided for rocking the crank axle 5 so as to raise or lower the frame structure upon the ground wheels 6 as the ground wheels 6 are rotated by the power draft device, which means are preferably of the following construction:

Welded to the crank arms 18 of the crank axle 5 are standards 19, in which standards 19 a shaft 20 is journaled.

Secured to the ground wheels 6 or to the stud portion of the crank axle 5 are two racks 21 which have a plurality of teeth formed around their periphery.

Secured to the shaft 20 are arms 22, which arms 22 at their opposite ends carry rack engaging rollers 23 which are adapted to be engaged with any one of the tooth racks 21 so as to rigidly connect the crank axle 5 with the ground wheels 6 so that on rotation of the ground wheels 6 the crank axle 5 will be rocked to elevate the frame structure.

Means are provided for releasing the rollers 23 from the tooth racks 21, which means may be of any desired or preferred construction and are herein illustrated as comprising arms 24 which are secured to or formed integral with the arms 22 and which are held in position to engage stops 25 which are adjustably secured to the bars 7 by any suitable means, such as illustrated at 26, so as to adjust the point at which the roller 23 is disengaged from the tooth rack 21 to prevent further elevation of the frame structure.

Means are provided for holding the frame structure in elevated position, which means may be of any desired or preferred construction one form of which is specifically described in my copending application for power lift filed September 29, 1926, Serial No. 138,532, and comprises an arm 27 which is rigidly secured to the transverse section of the crank axle 5 substantially intermediate the ends thereof and is pivotally secured at a pin 28 to a rod 29 which rod 29 passes through a bifurcated standard 30 and is provided with adjustable stop means 31 for limiting the lowering of the frame structure by the rocking of the crank axle 5. The rod 29 carries an abutment 32 which is adapted to be engaged by a roller mounted upon a pin 33 mounted within a yoke 34, which yoke 34 is secured to or formed integral with a lever 35 which is pivotally secured to the standard 30. By actuation of the lever 35 the roller is disengaged from the abutment 32 so as to permit the frame to rock upon the crank axle 5 and be lowered.

Means are provided for resisting the lowering of the frame upon the crank axle 5, which means may be of any desired or preferred construction and are herein illustrated as comprising a pair of tension springs 36 which are adjustably secured by hook bolts 37 to the angle sections 16 and at their opposite ends secured to a clip 38. The clip 38 is secured to an arm 27.

Means are provided for rotating the shaft 20 to engage the rollers 23 with the tooth rack 21, which means may be of any desired or preferred construction and are herein illustrated as comprising an actuating lever 39 which is rigidly secured to the shaft 20 and which is provided at its upper end with a flexible connecting member such as a rope 40 which extends forward of the frame structure to a tractor or power device which is provided for drawing the device embodying this invention over the ground. The actuating lever 35 is also provided with a flexible connecting member, such as a rope 41, which likewise extends forward from the frame structure to a point of accessibility from the tractor or power device.

Means are provided for adjustably supporting ground tools from the frame structure, which means are preferably of the following construction:

A pair of oppositely disposed sub-frames 42 are provided which may be of any desired or preferred construction and which are provided at their upper ends with spaced apart angle irons 43 intermediate with which bolts 44 are adjustably or slidably mounted. The bolts 44 are provided at their upper ends with U-shaped plates 45 which are adapted to fit over the upwardly extending portions of the pairs of angle irons 3. The bolts 44 are provided at their upper ends with nuts. This provision of the spaced angle irons 43 and the sub-frames 42, together with the spaced guides 4 between which the bolts 44 are extended, permits a degree of adjustment of the sub-frames 42 relative to the frame of the device.

Pivotally mounted at the lower ends of the sub-frames 42 on shafts 47 are ground tool carrying frames 48 which may be of any desired or preferred construction, one form of which is illustrated as comprising a shaft 49 upon which concavo convex discs 50 are secured, and which shaft 49 is journaled in bearings supported by the ground tool carrying frames.

Means are provided for adjustably securing the ground tool carrying frames to the sub-frames 42, which means may be of any desirable or suitable construction and are herein illustrated as comprising a pair of links 51 which are secured to the ground tool carrying frames 48 by means of bolts 52 which are adapted to be passed through any one of a plurality of bores 53 formed in the said links 51. The links 51 are slotted at their upper end as illustrated at 54 and are secured to the sub-frame 42 at an angle section 55 by means of a bolt 56 which is passed through the angle section 55 and passes the slots 54 and beyond the links 51.

The means provided for adjustably securing the ground working tools to the frame structure are both of the same construction so that only one of the same has been described.

It will be apparent from the foregoing that as the crank axle is journaled to the rear of the second guideways 4, that on rocking of the crank axle 5, the ground working tools will be subjected to a direct straight line pull so as to maintain the ground wheels 6 in engagement with the ground and so as to prevent the imposing upon the frame structure of any unnecessary angular strain as will be the case if the ground working tools were not supported upon a structure of the type heretofore described.

Means are provided for securing a second unit of ground working tools to the frame structure of the device so that the banking or ridging of the plants or vegetation may be performed in a stepwise manner to draw in from the banks or ridges soil which may then be moved in and banked up by the forward pair of ground working tools, which means are preferably of the following construction:

A frame structure, similar to the frame structure heretofore descibed, and comprising two pairs of spaced apart angle irons 57 is provided. The two pairs of spaced apart angle irons 57 provide guideways 58 which are similar to the spaced guides 4, and within which guides 4 sub-frames and disc carrying frames exactly similar to the sub-frames 43 and ground tool carrying members 48 are mounted so that it is not deemed necessary for applicant to specifically describe and point out the same, but the same have been provided by the same reference numerals as the sub-frame 42 and ground tool carrying frames 48. The second pair of spaced apart guides 57 are at their ends secured to bars 59 and at their intermediate portions are secured by means of brackets 60 to an intermediate bar 61. The bars 59 and 61 extend beyond the forward pair of angle irons 57 and are provided with eyes 62. The bars 59 may be spaced apart a slightly greater distance than the bars 1 which are provided with complementary eyes 63 through which eyes 62 and 63 any desirable or suitable form of fastening means, such as bolts, (not shown) may be passed for securing the auxiliary frame structure to the frame structure or device.

Truss means are provided for rigidly supporting the auxiliary frame structure to the frame structure of the device, which means preferably comprise bars 64 which are secured to angle sections 65 of the auxiliary frame structure, and which bars 64 are pivotally secured intermediate spaced apart bars 66, which spaced apart bars 66 are adapted to be secured to the forward extending sections of the spaced apart bars 1 by any suitable means, such as by passing bolts through the complementary bores 69 formed in the bars 1 and 66, respectively.

An intermediate brace-link 70 is pivotally secured to the bar 66 at one end and is adapted to be secured to an angle section 71 at its opposite end by any suitable or desirable means such as by passing bolts through the complementary bores 72 and 73 formed in the angle section 71 and links 70, respectively.

Means are provided for adjusting this truss structure, which means are herein illustrated as comprising a plurality of bolt holes 74 by means of any one of which the bar 64 may be secured to the bar 66. A like adjustment is provided in the brace link 70 by means of the adjustment bore 75.

The mounting of the crank axle 5 to the rear of the second pair of angle irons 3, in addition to providing a better balanced frame when only one set of ridging discs 50 are used, provides a balance structure when the auxiliary frame and set of ridging discs 50 are mounted in position and enables the device to operate without "side swiping". Side swiping is a common defect in former devices of this structure and prevents the forming of true ridges and slows up the ridging operation.

In order to permit a variation of uses of a single implement embodying this invention and so as to provide additional vertical adjustment of the ridging discs 50, when, for example, it is desired to change the use from an asparagus ridging to a cantaloup ridging implement, which plants require different conditions of ridging and so as to enable the manufacture of a single implement that can be employed for either use, I prefer to secure the bearing in which the crank axle 5 is journaled on the frame to independent angle sections 80 as illustrated in Figures 4 and 5. The angle sections 80 are in turn removably secured to the bars 1 by any suitable means, such as the bolts 81. By removing the bolts 81, the angles 80 may be inverted by turning the axle 5 journaled in bearings secured on either the top or bottom of the frame structure, thus providing the additional adjustment required.

Having fully described a preferred embodiment of my invention, it is to be understood that I do not wish to be limited to the exact details of construction herein set forth, which may obviously be varied without departing from the spirit of my invention as set forth in the appended claims.

I claim:

1. In an implement of the class described, the combination of a frame including two pairs of spaced apart angle irons providing spaced guideways, a crank axle journaled in bearings transversely of the said frame to the rear of the said pairs of angle irons, ground working tools journaled on the axle, means for rocking the crank axle to elevate the frame, a pair of sub-frames, means for adjustably securing the said sub-frames in spaced apart relation to the said frame in the said guideways, a disc carrying frame pivotally secured to each said sub-frame, and means for adjusting the said disc carrying frames in angular relation to the said ground.

2. In an agricultural implement of the class described, the combination of a frame having spaced guideways, a crank axle journaled in bearings transversely of the said frame to the rear of the said spaced guideways, ground wheels journaled on the said axle, means for rocking the said crank axle to elevate the frame, spaced frames slidably secured to the said frame in the said guideways, a ground tool carrying frame pivotally secured to each said sub-frame, means for adjusting the said ground working tool carrying frames in angular relation to the ground, an auxiliary frame, truss means for securing the said auxiliary frame to the first said frame, the said auxiliary frame providing spaced apart guideways, spaced sub-frames slidably secured in the said auxiliary frame guideways, a ground tool carrying frame pivotally secured to each of said auxiliary frame sub-frames, and means for adjusting the latter said ground tool carrying frame in angular relation to the ground.

3. In an agricultural implement of the class described, the combination of a frame having spaced guideways, a crank axle journaled in bearings transversely of the said frame to the rear of the said spaced guideways, ground wheels journaled on the said axle, means for rocking the said crank axle to elevate the frame, spaced sub-frames adjustably secured to the first said frame in the said guideways, a ground tool carrying frame pivotally secured to each said sub-frame, an axle journaled in bearings in each of said ground tool carrying frames, a plurality of concavo convex spaced discs secured to each of the latter said axles, and means adjustably secured to the said ground tool carrying frames and adjustably secured to the said sub-frames for adjusting the said ground tool carrying frame in angular relation to the ground.

Signed at Santa Ana, Cal. this 20th day of Sept., 1926.

HEBER F. TOWNER.